United States Patent [19]

van der Lely

[11] 4,149,600
[45] Apr. 17, 1979

[54] SOIL CULTIVATING MACHINES

[76] Inventor: Cornelis van der Lely, 7, Bruschenrain, Zug, Switzerland

[21] Appl. No.: 806,663

[22] Filed: Jun. 15, 1977

[30] Foreign Application Priority Data

Jun. 18, 1976 [NL] Netherlands .................. 7606596

[51] Int. Cl.² ............................................ A01B 33/06
[52] U.S. Cl. ...................................... 172/40; 172/59; 172/699
[58] Field of Search ................... 172/699, 40, 59, 54

[56] References Cited

U.S. PATENT DOCUMENTS

| 3,066,745 | 12/1962 | Smith | 172/59 |
| 3,706,207 | 12/1972 | Cornelius | 172/40 |
| 3,937,460 | 2/1976 | van der Lely | 172/59 |

FOREIGN PATENT DOCUMENTS

| 1918680 | 1/1971 | Fed. Rep. of Germany | 172/40 |
| 2607363 | 10/1976 | Fed. Rep. of Germany | 172/40 |
| 25566 | 2/1915 | Norway | 172/40 |
| 165937 | 11/1964 | U.S.S.R. | 172/40 |

Primary Examiner—Richard J. Johnson
Attorney, Agent, or Firm—William B. Mason; Penrose Lucas Albright

[57] ABSTRACT

A cultivating machine has subsoil tines and corresponding plate-shaped elements are pivoted to the lower portions of the tines. A driving mechanism, including at least one eccentric is connected to one or more of the elements or tines and the elements are caused to pivot up and down at their working depths to only partially raise the subsoil. The driving mechanism can also be connected to a further soil working member with soil engaging bars positioned to oscillate and work the topsoil.

12 Claims, 17 Drawing Figures

SOIL CULTIVATING MACHINES

According to one aspect of the invention, there is provided a soil cultivating machine of the kind set forth, wherein a plurality of such tines are provided in side-by-side relationship, at least one of them being furnished with an upwardly and downwardly movable plate-shaped element whose rearmost end, with respect to the intended direction of operative travel of the machine, is not in advance of the rear of the corresponding tine at the same horizontal level as said rearmost end.

For a better understanding of the invention, and to show how the same may be carried into effect, reference will now be made, by way of example, to the accompanying drawings, in which.

Referring firstly to FIGS. 1 to 5 of the accompanying drawings, the soil cultivating machine that is illustrated therein comprises a hollow frame portion 1 that extends substantially horizontally transverse, and usually substantially horizontally perpendicular, to the intended direction of operative travel of the machine which is indicated throughout the drawings by an arrow A. A plurality, such as twelve, of upwardly extending, and usually vertically or substantially vertically disposed, shafts 2 are rotatably supported by the hollow frame portion 1 in a single row that is parallel to the transverse length of said frame portion, the longitudinal axes (axes of rotation) of said shafts 2 being spaced apart from one another at regular distances which advantageously, but not essentially, have magnitudes of substantially 25 centimeters. The shafts 2 project downwardly from beneath the bottom of the hollow frame portion 1 and there have corresponding soil working members 3 fastened to them so as to be rotatable with the respective shafts 2. Each soil working member 3 comprises a pair of diametrically opposed rigid tines 4 which have soil working portions that extend downwardly into the soil (see FIG. 2) when the machine is in operation. The opposite ends of the hollow frame portion 1 carry substantially vertical side plates 5 that are in parallel relationship with one another and parallel or substantially parallel relationship with the direction A, both side plates 5 being extended forwardly beyond, and rearwardly behind, the front and back of the hollow frame portion 1 with respect to the direction A. The two side plates 5 carry, substantially midway between their foremost and rearmost edges, horizontally aligned stub shafts 6 about which corresponding rearwardly extending arms 8 are upwardly and downwardly turnable alongside the adjoining plates 5. The arms 8 project rearwardly by some distance beyond the rearmost edges of the side plates 5 and their rearmost ends are provided with substantially horizontally aligned bearings between which a supporting member, in the form of an open ground roller 9, is freely rotatable. The roller 9 has a working width which is equal to, and in register with, the combined working width of the twelve soil working members 3 and its axis of rotation is substantially horizontally parallel to the row of members 3 and is thus perpendicular, or substantially perpendicular, to the direction A. The roller 9 comprises a central axially disposed tubular carrier 10 to which a plurality, such as seven, of vertically disposed circular support plates 11 are fastened at regularly spaced apart intervals throughout substantially the whole of the length of the carrier, said support plates 11 being parallel to one another and parallel or substantially parallel to the direction A. The support plates 11 are formed, close to their periphery, with a plurality (such as eight) of circular holes that are spaced apart from one another at regular angular intervals, such as 45°, about the longitudinal axis of the carrier 10. Elongate elements of either solid rod-like or tubular formation are entered lengthwise through the peripheral holes in the successive support plates 11 and it will be noted from FIG. 1 of the drawings that said elements 12 are preferably, but not essentially, entered through said peripheral holes so as to extend helically around the central tubular carrier 10. The rearmost edges of the side plates 5 with respect to the direction A are formed with curved rows of holes 14 that are spaced by equal distances from the axis defined by the aligned stub shafts 6. The arms 8 are formed with single holes at the same distance from said axis and clamping bolts 13 are provided for horizontal entry through the single holes in the arms 8 and chosen holes 14 to retain said arms 8 in corresponding angular settings about the axis defined by the stub shafts 6 and thus to retain the axis of rotation of the roller 9 at a chosen horizontal level relative to that of the frame portion 1. The level of the axis of rotation of the roller 9 that is chosen is a principal factor in determining the maximum depth of penetration of the tines 4 (and of other parts of the machine that will be discussed below) into the soil which is possible during operation of the machine.

Four supports 16 that are of channel-shaped cross-section are bolted to the top of the hollow frame portion 1 at regularly spaced apart intervals along the transverse length of said frame portion. The four supports 16 extend longitudinally parallel to one another and parallel or substantially parallel to the direction A to locations that are well in advance of the front of the hollow frame portion 1 with respect to said direction A. With the preferred spacing between the longitudinal axes of the shafts 2 that has been discussed above, the longitudinal axes of said supports 16 are spaced apart from one another at intervals of substantially 75 centimeters, the four supports 16 being in register with the second, fifth, eighth and eleventh shafts 2 along the row of twelve such shafts counting from either end of that row (see FIG. 1), vertical planes that extend parallel or substantially parallel to the direction A and that contain the longitudinal axes of the four supports 16 also containing the axes of rotation of those four shafts 2 which have just been mentioned with this arrangement. Another consequence of the described arrangement is that the outermost two of the four supports 16 are spaced from the opposite ends of the hollow frame portion 1 by distances which are substantially half the regular distance between the four supports themselves. The limbs of the four channel-shaped supports 16 project upwardly from their webs or bases, the latter having a frame beam 17 clamped to the lower surfaces of their forwardly projecting portions by bolts 19 and clamping plates 18. The frame beam 17 is of polygonal cross-section and preferably has the hollow formation and square cross-section that is illustrated in the drawings, the opposite ends of said beam 17 being rigidly secured to the facing surfaces of the forwardly projecting portions of the two side plates 5. The frame beam 17 is, of course, horizontally or substantially horizontally disposed and has its longitudinal axis in parallel relationship with that of the hollow frame portion 1. With the preferred square cross-section that is illustrated, the parallel upper and lower surfaces of the beam 17 are both substantially horizontally disposed.

The aforementioned clamping plates 18 which assist in securing the frame beam 17 to the supports 16 are each provided with a corresponding cultivating tool that is generally indicated by the reference 20. Each cultivating tool 20 includes a strip-shaped tine 21 whose uppermost end is welded or otherwise rigidly secured to the lowermost surface of the respective clamping plate 18 so as to extend downwardly therefrom and obliquely forwardly, with respect to the direction A, at a few degrees to the vertical, the general plane of each strip-shaped tine 21 being in parallel or substantially parallel relationship with the direction A. The lowermost edge of each tine 21 is bevelled downwardly and forwardly with respect to the direction A (see FIG. 3) and two strips 22 are welded to the tine immediately above said lower edge (see FIG. 5), the strips 22 extending forwardly by a short distance beyond the leading edge of the tine. A horizontal pivot pin 23 perpendicularly interconnects the forwardly projecting portions of the two strips 22 of each pair and a lug 24 is turnably mounted on the pivot pin 23 between the two strips 22. Each lug 24 is welded or otherwise regidly secured to the bottom of a corresponding plate-shaped element 25. Immediately to the rear of the lug 24, with respect to the direction A, each of said elements 25 is formed with a slot 26 through which slot is entered the corresponding tine 21 so that said elements 25 surround the tines 21 immediately above the strips 22 that are fastened to the opposite sides of the tines 21 at the lowermost downwardly and forwardly bevelled ends of the latter.

Figure 1:
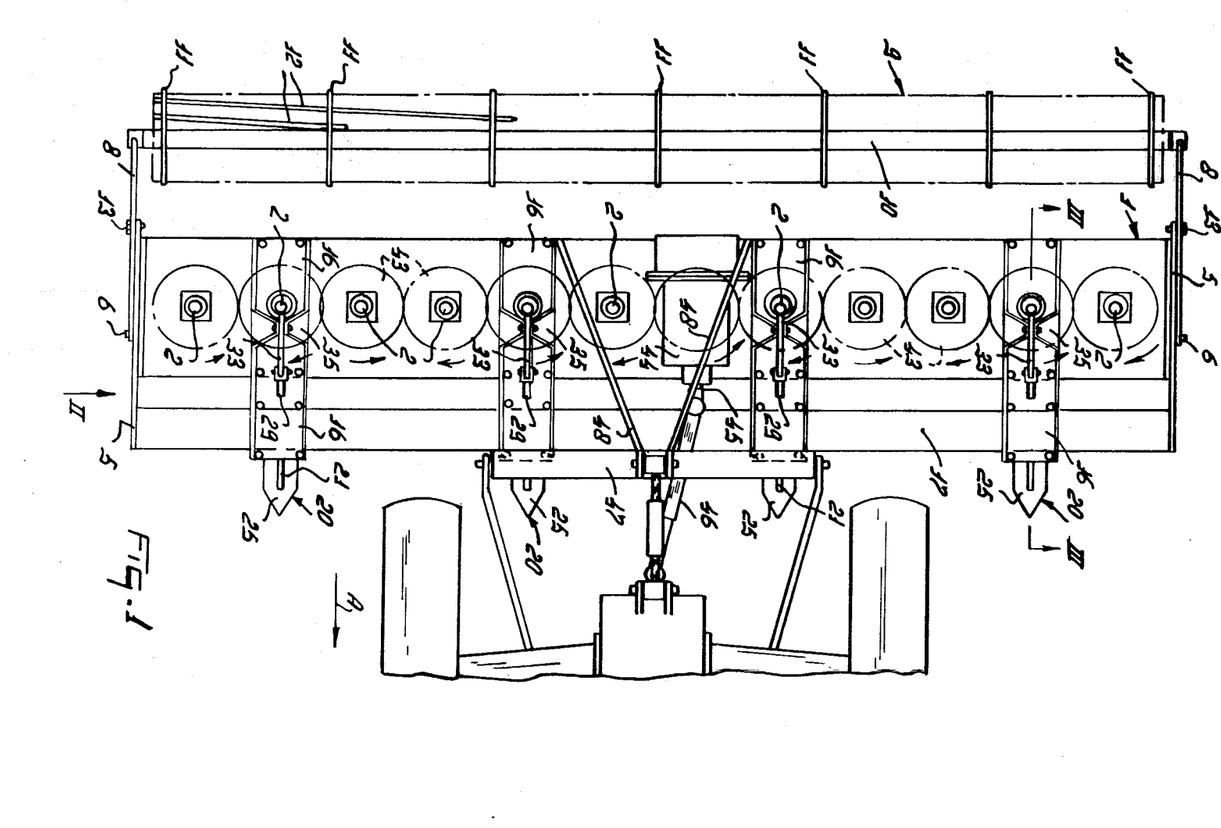
FIG. 1 is a plan view of a soil cultivating machine in accordance with the invention connected to the rear of an agricultural tractor.
Figure 2:
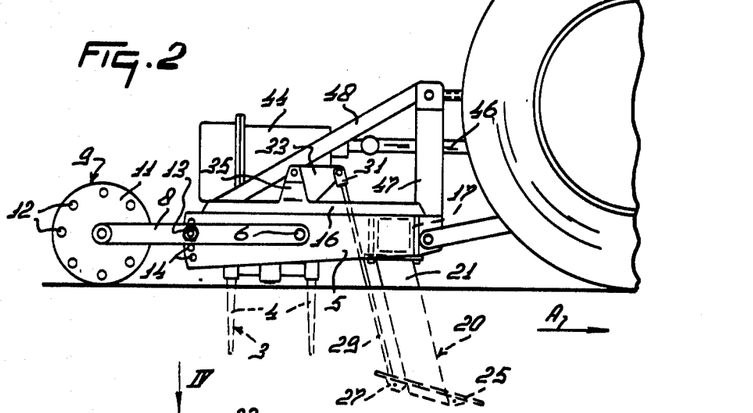
FIG. 2 is a side elevation as seen in the direction indicated by an arrow II in FIG. 1.
Figures 3, 5:
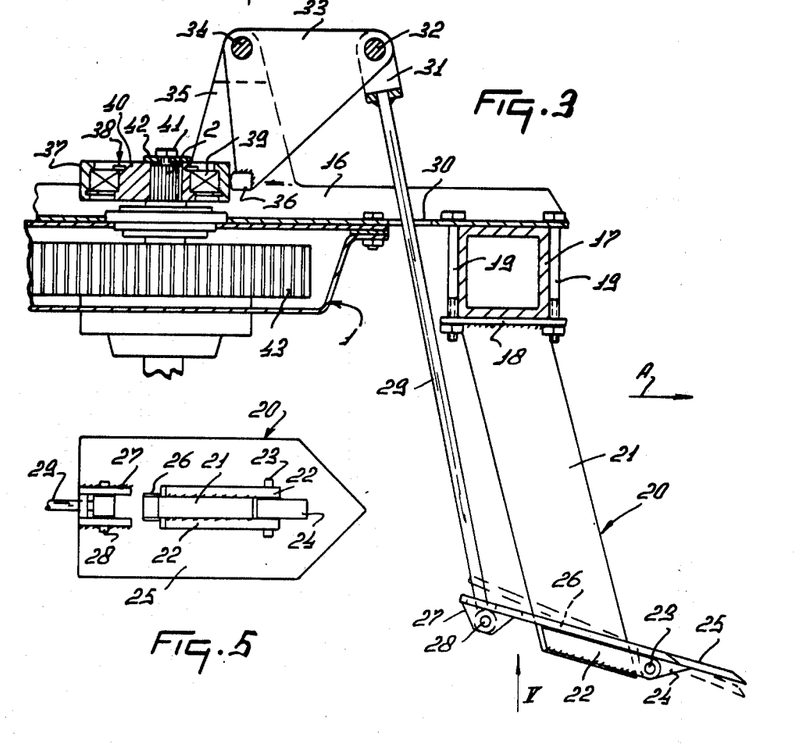
FIG. 3 is a section, to an enlarged scale, taken on the line III—III in FIG. 1.
FIG. 5 is an underneath plan view as seen in the direction indicated by an arrow V in FIG. 3.
Figure 4:
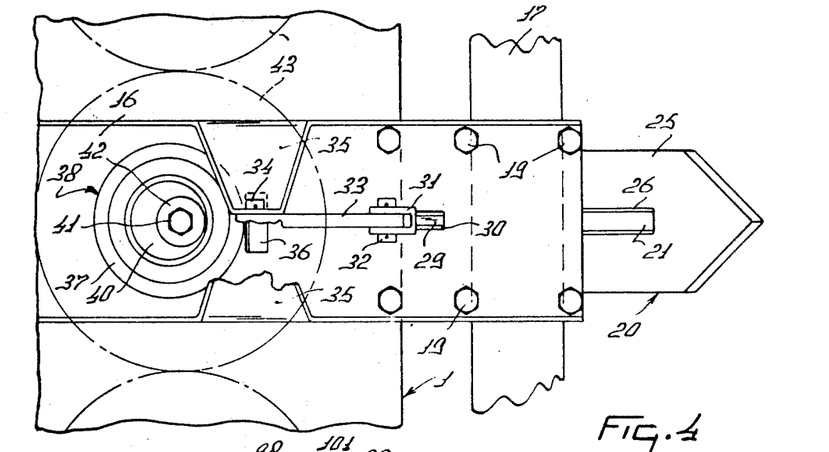
FIG. 4 is a plan view as seen in the direction indicated by arrow IV in FIG. 3.

As can be seen best in FIG. 5 of the drawings, the plate-shaped element 25 of each cultivating tool 20 is elongate in the direction A and has a V-shaped point whose edges are formed as cutting edge (see FIG. 3). The elements 25 extend behind the rearmost edges of the tines 21 and there have pairs of downwardly directed lugs 27 welded or otherwise rigidly secured to their lower surfaces in substantially coplanar relationship with the strips 22 of the corresponding pairs. A horizontal pivot pin 28 perpendicularly interconnects the downwardly projecting lugs 27 of each pair and a sleeve is turnably mounted thereon between said lugs. A connecting rod 29 has one of its ends rigidly secured to the outer curved surface of each sleeve and pin 28 and said rod 29 extends obliquely upwardly and rearwardly away therefrom through a small opening near the rear edge of the respective element 25. The connecting rods 29 are entered through holes 30 in the webs or base of the corresponding supports 16 and their uppermost ends are welded or other wise rigidly secured to the bases of corresponding forks 31. The limbs of each fork 31 are pivotally connected by a horizontal pin 32 to the leading corner (with respect to the direction A) of a corresponding substantially triangular rocker 33 that is formed from sheet metal or other sheet material. An upper rear corner of each rocker 33 is pivotally connected by a further horizontal pin 34 to the upper extremities of a pair of upward projections 35 that are formed integrally with the limbs of the corresponding support 16 in the upwardly tapering shape that will be apparent from a study of FIGS. 1, 3 and 4 of the drawings. The third corner of each rocker 33 carries a wear-resistant slider 36 having a rearwardly directed surface that is in operative engagement with the outer curved surface of a corresponding ring 37. The ring 37 forms part of an eccentric mechanism that is generally indicated by the reference 38, there thus being four of said mechanisms 38 that are mounted at upwardly projecting ends of the four previously mentioned shafts 2 that register with the four channel-shaped supports 16. The ring 37 of each mechanism 38 surrounds the outer race of a ball bearing 39 whose inner race, in turn, surrounds a circular shoulder of an eccentric 40, the center of curvature of said shoulder thus being significantly spaced from the longitudinal axis (axis of rotation) of the corresponding shaft 2. Each eccentric 40 has an internally splined bore whose splines co-operate with external splines on the upwardly projecting portion of the respective shaft 2, a washer 42 and an axial bolt 41 being provided to maintain the eccentric in its appointed position on the shaft 2 and said rings 37 and eccentrics 40 being formed with shoulders and grooves (to co-operate with circlips) to maintain the rings 37 and the ball bearings 39 in their appointed axial positions relative to the eccentrics 40 (see FIG. 3).

Each of the twelve shafts 2 is provided, inside the hollow frame portion 1, with a corresponding straight-toothed or spur-toothed pinion 43, said pinions 43 being of such sizes and being so arranged relative to one another that each pinion 43 has its teeth in mesh with those of its immediate neighbour, or both of its immediate neighbours, in the single row of twelve pinions 43. Thus, when the machine is in operation, each pinion 43 will rotate, together with the corresponding shaft 2 and soil working member 3, in a direction that is opposite to the direction of rotation of the or each immediately neighbouring pinion 43 and the corresponding parts 2 and 3. One of the center pair of twelve shafts 2 has an upward extension through the top of the hollow frame portion 1 into a gear box 44 mounted on top of said frame portion. The gear box 44 has a forwardly projecting rotary input shaft 45 whose leading splined or otherwise keyed end can be placed in driven connection with the rear power take-off shaft of an agricultural tractor or other operating vehicle through the intermediary of a telescopic transmission shaft 46, that is of a construction which is known per se, having universal joints at its opposite ends. Bevel pinions within the gear box 44 and straight-toothed or spur-toothed pinions within a change-speed gear mounted at the back of the gear box 44 place the rotary input shaft 45 in driving connection with the upward extension of said one of the shafts 2 and thus in driving connection with all twelve of said shafts 2 and the soil working members 3 that are carried thereby. The change-speed gear that is mounted at the back of the gear box 44 does not need to be described nor illustrated in detail for the purposes of the present invention but allows different speeds of rotation of the shafts 2 to be attained in response to a substantially constant input speed of rotation applied to the forwardly projecting rotary shaft 45. The front of the frame beam 17 with respect to the direction A is provided, midway between the planes of the two side plates 5, with a coupling member or trestle 47 that is of generally triangular conficuration when seen in front or rear elevation. The coupling member or trestle 47 is constructed and arranged to co-operate with the rear-mounted three-point lifting device or hitch of an agricultural tractor or other operating vehicle in connecting the frame of the machine to such a tractor or other vehicle in the manner that is shown somewhat diagrammatically in FIGS. 1 and 2 of the drawings. Substantially the apex of the generally triangular coupling member or trestle 47 is connected to horizontally spaced apart points at the top and rear of the hollow frame portion 1 by strengthening tie bars 48 which diverge downwardly and rearwardly, with respect to the direction A, from the top of the coupling member or trestle 47.

In the use of the soil cultivating machine that has been described with reference to FIGS. 1 to 5 of the drawings, its coupling member or trestle 47 is connected to the three-point lifting device or hitch of an agricultural tractor or other operating vehicle in the manner that has been briefly described above and the rotary input shaft 45 of the gear box 44 is placed in driven connection with the rear power take-off shaft of the same tractor or other vehicle by way of the known telescopic transmission shaft 46 that has universal joints at its opposite ends. Adjust-ments that may be required before work commences include setting the maximum depth of which the tines 4 of the soil working members 3 and the cultivating tools 20 can penetrate into the soil by raising or lowering the level of the axis of rotation of the roller 9 relative to the frame of the machine using the clamping bolts 13 and chosen holes 14 as described above. The speed of rotation of the soil working members 3 in response to a substantially constant input speed of rotation applied to the shaft 45 can be increased or decreased by an appropriate adjustment of the change-speed gear that is mounted at the rear of the gear box 44. These adjustments will usually be made with regard to the nature and condition of the soil that is to be worked and the particular purpose for which that soil is required after cultivation. During operative progress in the direction A, the elements 25 at the lower ends of the cultivating tools 20 are at a considerable depth beneath the ground surface and are certainly at a depth beneath that of the lowermost ends of the tines 4. The elements 25 oscillate continually upwardly and downwardly about the axes defined by the pivot pins 23 due to the action of the eccentric mechanisms 38. FIG. 3 of the drawings illustrates, in full lines, a position of one element 25 in which its lower surface is substantially in downwardly abutting contact with the upper surfaces of the corresponding two strips 22 which thus acts as stops preventing any further angular displacement of the illustrated element 25 in an anticlockwise direction (as seen In FIG. 3) about its pivot pin 23. The parts 29, 33 and 38 are shown in FIG. 3 in corresponding positions. As the shaft 2 shown in FIG. 3 rotates, the outer curved surface of the ring 37 (which does not itself necessarily rotate) moves forwardly with respect to the direction A in the region thereof that is in contact with the slider 36. The substantially triangular rocker 33 is thus displaced angularly about the pivot pin 34 in an anticlockwise direction as seen in FIG. 3 and the pivot pin 32 is displaced upwardly. The upward displacement of the pivot pin 32 causes a similar substantially axial displacement of the connecting rod 29 which must be followed by the element 25 that is pivotally connected thereto at the pin 28. The element 25 turns in a clockwise direction as seen in FIG. 3 about the pivot pin 23 into substantially the position thereof that is shown in broken lines in FIG. 3. The element 25 will almost invariably be moving in the direction A at subsoil level and the layer of subsoil that has been at least partly cut loose by the leading cutting edges of the element 25 will be elevated through a short distance by the oblique disposition of the upper surface of the element and by the positive displacement thereof which is brought about mechanically by the connecting rod 29. No spring or other positive returning mechanism is necessary to move the element 25 back from the broken line position of FIG. 3 of the full line position that is illustrated in the same FIG. because the continued progress in the direction A and the weight of the overlying soil combine to produce a high anticlockwise restoring moment on the element 25 tending to turn it about its pivot 23 in an anticlockwise direction as seen in FIG. 3. Thus, the slider 36 will tend always to remain in contact with the ring 37 during operation of the machine although there may be very exceptionally be momentary losses of contact therebetween.

The subsoil above the slightly variable level of the leading points of the elements 25 is lifted and thus coarsely broken by the tools 20 whose tines 21, of course, also contribute significantly to the coarse soil-breaking effect, it being noted that the connecting rods 29 lie closely behind the tines 21 with respect to the direction A in register, in that direction, with those tines so that said rods 29 pass easily through the vertical "slots" that are formed in the soil by the tines 21. The overlapping top soil is broken up much more intensively by the rotary motion of the soil working members 3 and any insufficiently crumbled lumps of top soil that may exceptionally be left lying upon the ground surface behind said members are engaged by the roller 9 which acts as a final soil crumbling and soil levelling member of the machine in addition to performing its supporting function. A level and well cultivated bed of soil is thus produced in which the top soil has been intensively crumbled while the underlying layer of subsoil has been broken up in a much coarser manner. It is particularly noted that this method of cultivating the soil ensures that both the subsoil and the top soil are broken up to respective appropriate extents without, however, any significant mixing of the two layers taking place. Such mixing constitutes a significant disadvantage of many known methods of deep cultivation because, in particular, with such known methods, the bacteria in the top soil tend to be displaced downwardly to a too deep subsoil level with a consequent serious disturbance of the biological equilibrium in the top soil. Any seeds and/or young plants that are introduced into the soil after such disturbance frequently suffer the disadvantage of that disturbance as regards optimum germination and growth. A method of deep cultivation that employs the machine that has so far been described or one of the machines that will hereinafter be described involves so little, if any, disturbance to the biological equilibrium of the top soil that the conditions for subsequent seed germination and plant growth are not adversely effected to any noticeable extent, if at all. Any minor disturbance that may have occurred is so small that the normal balance is restored naturally in a very short period of time.

Figure 6:
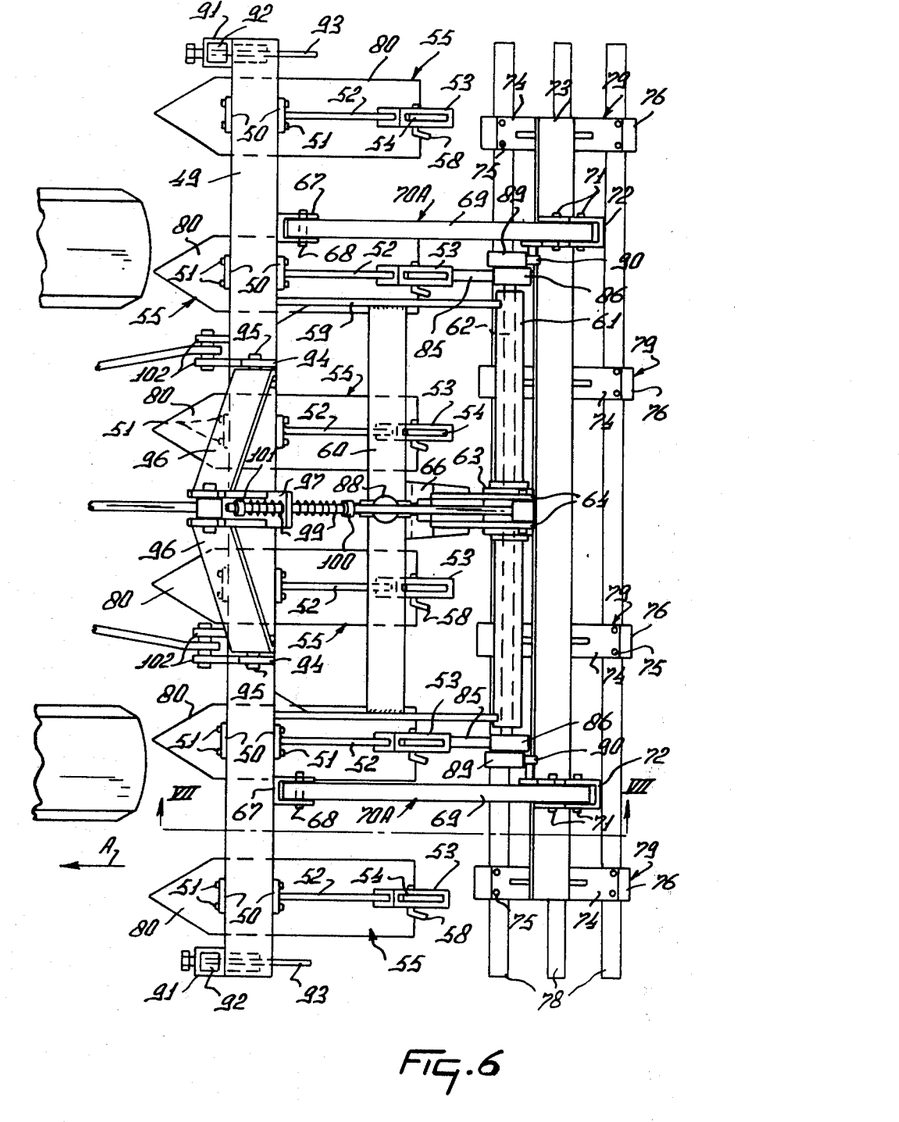
FIG. 6 is a plan view of a second embodiment of a soil cultivating machine in accordance with the invention connected to the rear of an agricultural tractor.
Figure 7:
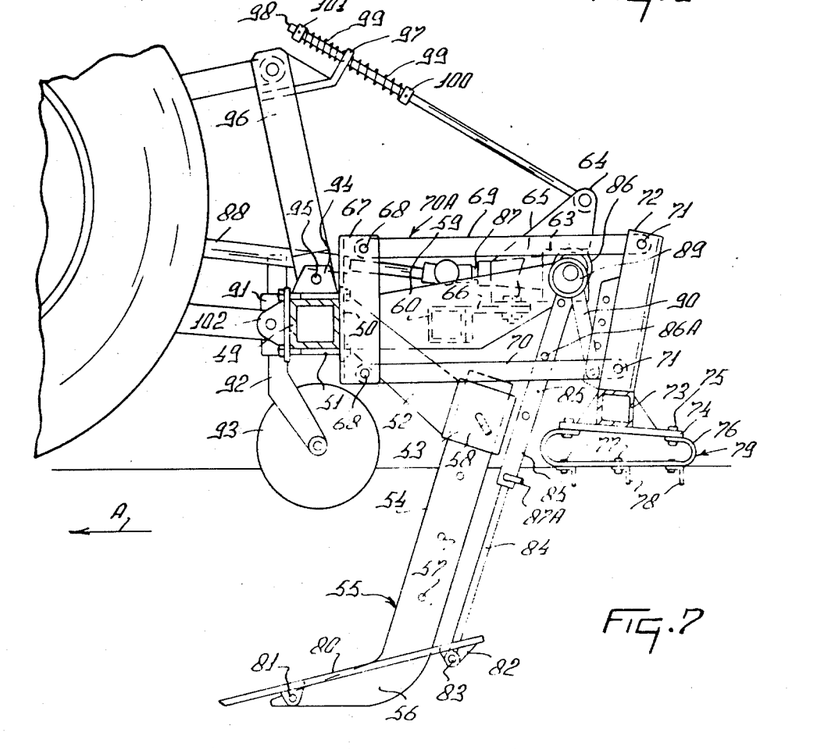
FIG. 7 is a section taken on the line VII—VII in FIG. 6.

FIGS. 6 and 7 of the drawings illustrate an alternative form of soil cultivating machine in accordance with the invention which machine comprises a frame beam 49 that extends substantially horizontally transverse, and usually substantially horizontally perpendicular, to the direction A. The beam 49 should have a polygonal cross-section and preferably has the hollow formation and square cross-section that is illustrated. With this preferred square cross-section, the upper and lower surfaces of the beam 49 are both horizontally or substantially horizontally disposed and, if the beam is of some other polygonal cross-section, it should be one which makes a similar disposition of the upper and lower surfaces thereof possible. A plurality, such as six, of downwardly and rearwardly, with respect to the direction A, inclined supports 52 have plates 50 at their upper leading ends securely, but releasably, fastened to the substantially vertical rear surface of the beam 49 by groups of substantially horizontally disposed bolts 51 and co-operating leading clamping plates 50 that are similar to the plates 50 which have just been mentioned above except that they are free of direct rigid connection to the supports 52 themselves. The lower rearmost end of each support 52 carries a corresponding sleeve 53 of oblong cross-section that is directed obliquely downwardly and forwardly with respect to the direction A from its upper end to its lower end. Each sleeve 53 receives a corresponding strip-shaped tine 54 that is part of a cultivating tool which is generally indicated by the reference 55, the cross-section of each tine 54 matching the internal shape of the corresponding sleeve 53 so that said tines 54 are slidable upwardly and downwardly through the sleeves 53 without excessive play. Due to the oblique dispositions of the sleeves 53, the tines 54 project downwardly and forwardly, with respect to the direction A, therefrom, each tine 54 being formed with a forwardly directed portion 56 at its lowermost end, said portion 56 having a substantially horizontal lower edge. The main straight portion of each tine 54 is formed with a plurality, such as four, of transverse holes 57 and, by sliding the tines 54 upwardly and downwardly through the sleeves 53, any chosen one of said holes 57 can be brought into register with a single pair of transverse holes that are formed through the walls of the sleeve 53 concerned. Horizontal locking pins 58 are provided for entry through the holes in the walls of the sleeves 53 and through the chosen intervening holes 57 and it will be apparent that the particular holes 57 which are chosen for co-operation with the locking pins 58 determine the extents of projection of the tines 54 downwardly and forwardly from the lower ends of the sleeves 53.

The leading ends of two parallel plate-shaped carriers 59 are rigidly to the ear surface of the frame beam 49 at equal distances towards the opposite ends of said beam 49 from the midpoint thereof, the rigid connections of the carriers 59 to the beam 49 being strengthened by triangular plates (FIG. 6). The two spaced carriers 59 are both parallel or substantially parallel to the direction A and it will be seen from FIG. 7 of the drawings that their shapes are such as to define upper edges that extend obliquely rearwardly with respect to the direction A from the beam 49 and upwardly at a few degrees to the horizontal so that the rearmost ends of said two carriers 59 are at a horizontal level which will usually be just above that of the upper surface of the beam 49. The two carriers 59 are rigidly interconnected at a location which is substantially midway between their leading and rearmost ends, with respect to the direction A, by a beam 60 that, like the beam 49, should have a plygonal cross-section. Preferably, as illustrated, the beam 60 has a hollow formation and square cross-section which latter is, however, somewhat smaller in size than that of the beam 49. The rearmost ends of the two carriers 59 are rigidly interconnected by a tube 61 that is of circular corss-section, said tube 61, because of its position, being located at a horizontal level which will usually be a little above those of the upper surfaces of both the beam 49 and the beam 60. The longitudinal axes of both the beam 60 and the tube 61 are in parallel relationship with the longitudinal axis of the beam 49. Bearings (not illustrated) in the tube 61 rotatably carry a driving shaft 62 which extends axially through said tube 61 to project by short distances beyond the opposite ends thereof. Further details of the construction and arrangement of the shaft 62 will be given below. The tube 61 includes, substantially midway along its length, a gear box 63 which gear box is fastened by a pair of plates 64 and bolts 65 to the horizontal limb of a bracket 66 of L-shaped cross-section whose vertical limb is welded or otherwise rigidly secured to the rear surface of the beam 60 substantially midway along the length of that beam. Two bars 67 that are both of channel-shaped cross-section have their webs or bases welded or otherwise rigidly secured to the rear surface of the beam 49 at two locations which are both short distances outwardly from the midpoint of the beam beyond the connections to that beam of the leading ends of the respective two carriers 59, the two bars 67 being substantially vertically disposed with their limbs projecting rearwardly with respect to the direction A from their leading webs or bases that are rigidly secured to the rear surface of the beam 49. The two limbs of each of the two bars 67 are perpendicularly interconnected close to their upper and lower ends by horizontal pivot pins 68, the upper and lower pins 68 of each pair being substantially vertically in register and the two upper pins 68 being substantially axially aligned as are the two lower pins 68. The leading end of an upper arm 69 is turnably mounted on each upper pivot pin 68 between the limbs of the corresponding bar 67 and, similarly, the leading end of a lower arm 70 is turnably connected by each lower pivot pin 68 to the lower ends of the limbs of the corresponding bar 67. The two upper arms 69 and two lower arms 70 both extend rearwardly with respect to the direction A from the respective bars 67, the lower arms 70 being a little shorter in length than the upper arms 69. The rearmost ends of the upper and lower arms 69 and 70 are pivotally connected by corresponding upper and lower pins 71 to upper and lower ends of the forwardly directed limbs of bars 72 that, like the bars 67, are of channel shaped cross-section, the bars 72 being arranged, however, with their limbs directed forwardly with respect to the direction A from their webs or bases. It will be seen from FIG. 7 of the drawings that, due to the difference in length between the upper arms 69 and lower arms 70, the bars 72 are inclined downwardly and forwardly from top to bottom, with respect to the direction A, at a few degrees to the vertical. The upper arms 69 and lower arms 70 are parts of pivotable linkages 70A which linkages are of quadrilateral form without being true parallelogram linkages. The two pivotable linkages 70A effectively co.operate to form a dual pivotable linkage.

The two bars 72 project downwardly benarth the lower pivot pins 71 by short distances and their lowermost ends are rigidly secured to the upper surface of a beam 73 that extends substantially horizontally perpendicular to the direction A in parallel or substantially parallel relationship with the beams 49 and 60 and the tube 61. The beam 73 should be of polygonal cross.section and preferably has the hollow formation and square cross-section that is illustrated. With this preferred shape, the parallel upper and lower surfaces of the beam are inclined upwardly and forwardly with respect to the direction A from rear to front at a few degrees to the horizontal. A plurality, such as four, of oblong strips 74 are welded or otherwise rigidly secured to the lower surface of the beam 73 at regular intervals along the length of that beam, each strip 74 being arranged with its longitudinal axis contained in a vertical plane that is substantially parallel to the direction A and being connected to the beam 73 in such a way that its leading end is in advance of the front of that beam by a somewhat shorter distance than that between the back of the beam and its rear end. The opposite ends of brackets 76 are firmly but releasably secured to the lower surfaces of the strips 74 at the leading and rear ends of those strips by bolts 75. Each bracket 76 has a substantially horizontally disposed flat bottom, the leading and rear ends of the bottom being curved upwardly and rearwardly, and upwardly and forwardly, respectively, through bends that differ marginally from 180° in extent. As will be clear from FIG. 7 of the drawings, the extremities of said upwardly curved ends are the parts of the brackets 76 which are releasably secured to the strips 74 by the bolts 75. The vertical extent of the front of each bracket 76 with respect to the direction A is substantially one-and-a-half times the vertical extent of the rear of that bracket. The substantially horizontal limbs of bars 78 that are of L shaped cross-section are firmly but releasably secured to the lower surface of the substantially horizontal bottom of each bracket 76 by small bolts 77, the substantially vertical limbs of the bars 78 thus projecting downwardly into the soil (when the machine is in use) from the rearmost edges of the substantially horizontal limbs. In the embodiment which is illustrated in FIGS. 6 and 7 of the drawings, there are three of the bars 78 per bracket 76, the substantially vertical limbs of the bars 78 extending substantially parallel to one another in substantially perpendicular relationship with the direction A at regularly spaced apart intervals in that direction. The four brackets 76 and their bars 78 together afford a soil working member 79 which, although actually discontinuous, is effectively elongate in a substantially horizontal direction that is substantially perpendicular to the direction A, the elongate soil working member 79 being disposed at the rear of the machine behind the six cultivating tools 55.

Both of the two outermost, and both of the two innermost, cultivating tools 55 of the row of six such tools have the forwardly directed portions 56 at the lowermost ends of their tines 54 provided with plate-shaped elements 80, said tine portions 56 being entered through slots in the elements 80 and the margins of said slots being welded or otherwise rigidly secured to the adjoining opposite surfaces of said tine portions. It is emphasised here that this is not the arrangement shown in FIG. 7 of the drawings. Each plate-shaped element 80 is of flat formation, is elongate (as seen in plan view - FIG. 6) in a direction parallel to the direction A and has a V-shaped point at its leading end, the rearwardly divergent sides of said pointed end being formed as cutting edges. Each element 80 is inclined downwardly and forwardly with respect to the direction A from its rear end to its leading point and it will be seen from FIG. 7 of the drawings that the point of each element 80 is located at substantially the same horizontal level as is the leading point of the portion 56 of the tine 54 to which said element 80 is connected.

The construction that has been described in the preceding paragraph in respect of four of the six cultivating tools 55 is varied for those two tools 55 which are the second and fifth from the opposite ends of the row thereof, counting from either end of that row. This different arrangement is the one that is illustrated in FIG. 7 of the drawings. The tine portions 56 of the two cultivating tools 55 under consideration are again entered through slots in corresponding plate-shaped elements 80 that are very similar to the elements 75 that have already been described. The elements 80 again extend laterally of the direction A to opposite sides of the tine portions 56 but, instead of the margins of the slots in said elements abutting strips secured to the adjoining opposite surfaces of the respective portions 56, the elements 80 in question are turnably connected to the corresponding tine portions 56. As shown in FIG. 7 of the drawings, each such element 80 carries a pair of downwardly directed lugs centrally across the width of its lower surface and towards the leading end of that surface with respect to the direction A. Said lugs are pivotally connected by a horizontal pin 81 to the intervening tine portion 56 at a location a short distance to the rear of the leading point of that portion 56. A pair of lugs 82 project downwardly from the lower surface of each pivotally mounted element 80 at the opposite sides of a hole that is formed through said element 80 midway across the width of the latter and just in front of its rearmost edge, said hole being in alignment with, but being separate from, the slot in the element 80 that receives the tine portion 56. A pivot pin 83 horizontally interconnects the two lugs 82 beneath said hole and a sleeve which surrounds the pivot pin 83 between the lugs 82 has one end of a connecting rod 84 welded or otherwise rigidly secured to it. The connecting rod 84 extends upwardly and rearwardly with respect to the direction A through said hole in the element 80, away from the pivot pin 83 in substantially parallel relationship with the longitudinal axis of the upper straight portion of the tine 54 that is located immediately in front thereof. The upper end of the connecting rod 84 is entered telescopically into the lower end of a coaxial tube 85 that continues upwardly and rearwardly in effective prolongation of the rod 84. The upper end (not visible) of the rod 84 is formed with a single transverse hole and the telescopically co-operating tube 85 is formed with four pairs of holes 86A that are spaced apart from one another along the length of the tube by the same regular distances as separate the holes 57 that are formed in the tines 54. Horizontal locking pins 87A are provided for entry through chosen pairs of the holes 86A in the two tubes 85 and the single holes at the upper ends of the co-operating rods 84 to maintain said rods 84 in corresponding positions of downward extension beneath the lower ends of the tubes 85. A study of FIG. 7 of the drawings will make it clear that, when an adjustment is effected to cause the locking pins 58 to co-operate with different holes 57 in the tines 54, the locking pins 87A must also be temporarily removed and be caused to co-operate with newly selected pairs of the holes 86A.

The uppermost end of each tube 85 is fastened to the outer surface of a ring of a corresponding eccentric mechanism 86, said eccentric mechanism 86 being disposed at one of the two ends of the aforementioned driving shaft 62 that projects beyond a corresponding end of the tube 61. The eccentric mechanisms 86 are basically similar to the previously described eccentric mechanism 40 (see FIG. 3) and are thus such that the outer rings thereof which are fixedly secured to the upper ends of the tubes 85 are caused to move orbiatally around the longitudinal axis of the driving shaft 62 when that shaft is driven. The orbital motions of said rings of the mechanisms 86 are transmitted by the tubes 85 and rods 84 to the two elements 80 and can only be accommodated by said elements 80 rocking upwardly and downwardly about the axes of the pivot pins 81 by which they are connected to the correspon-ding tine portions 56. The driving shaft 62 is provided, inside the gear box 63, with a bevel pinion (not visible) and said pinion has its teeth in driven mesh with those of a further bevel pinion carried at the rearmost end of a rotary input shaft 87 of the gear box whose leading splined or otherwise keyed end projects forwardly from the front of the gear box 63 in substantially the direction A. The rotary input shaft 87 can thus be placed in driven connection with the power take-off shaft of an agricultural tractor or other vehicle that is employed to move and operate the machine by way of an intermediate telescopic transmission shaft 88, that is of a construction which is known per se, having universal joints at its opposite ends. The two eccentric mechanisms 86 that are mounted close to the opposite ends of the driving shaft 62 have corresponding further eccentric mechanisms 89 mounted alongside them on that shaft. Once again, the eccentric mechanism 89 need not be described nor illustrated in detail since they may be of similar formation to the previously described eccentric mechanism 38 (FIG. 3). Preferably, to reduce wear and noise, the eccentrics of the mechanisms 89 are secured to the shaft 62 in 180° out of phase relationship with the eccentrics of the mechanisms 86. The outer orbital, but non-rotary, rings of the two further eccentric mechanisms 89 are fixedly secured to the upper ends of arms 90 which arms project downwardly and rearwardly with respect to the direction A to have their lowermost ends turnably connected by pivot bolts to strips that project forwardly from the inner limbs of the two channel-shaped bars 72. As can be seen in FIG. 7 of the drawings, said strips are formed with rows of regularly spaced apart holes and the pivot bolts by which the arms 90 are turnably connected to the strips can be engaged in chosen ones of the holes in those strips. The particular holes that are chosen for co-operation with the pivot bolts determine the initial angularity of the two pivotable linkages 70A and the level of the elongate soil working member 79 relative to that of the frame of the machine. It will be apparent that, upon rotation of the driving shaft 62, the elongate soil working member 79 will be caused to reciprocate upwardly and downwardly as the linkages 70A oscillate about the axes defined by the upper and lower pivot pins 68 in response to the movements of the outer rings of the further eccentric mechanisms 89 that are transmitted to the bars 72 by the arms 90.

The opposite ends of the frame beam 49 are provided, at the front thereof with respect to the direction A, with substantially vertically disposed sleeve-shaped holders 91 of square cross-section. Upper portions of carriers 92 are slidable upwardly and downwardly through the holders 91 and set bolts (FIG. 6) arranged in screwthreaded holes in the front walls of the holders 91 can be tightened to maintain the carriers 92 in chosen positions of downward projection from beneath the lower ends of the holders 91. Lower end regions of the carriers 92 are inclined downwardly and rearwardly towards the ground surface and are of forked construction. The lowermost extremities of the forks are interconnected by axle shafts and circular coulter discs 93 are mounted on said axles so as to be rotatable between the forks of the corresponding carrier portions. The coulter discs 93 penetrate into the ground during the use of the machine (see FIG. 7). Two lugs 94 are provided on top of the frame beam 49 at equal short distances from the midpoint of that beam, said lugs 94 being provided with stub shafts 95 that are substantially horizontally aligned in a direction parallel to the longitudinal axis of the beam 49. The lower ends of upwardly convergent stripshaped arms of a generally triangular coupling member or trestle 96 are turnably connected to the lugs 94 by the stub shafts 95 and the effect of this arrangement is that the upper coupling point of said member or trestle 96 that is provided at sustantially the apex thereof is angularly displaceable relative to the frame of the machine about the axis defined by the aligned stub shafts 95. Pairs of lugs 102 project forwardly with respect to the direction A from the front surface of the beam 49 at locations which substantially register with the lugs 94 and the two lugs 102 of each pair are perpendicularly interconnectible by pivots to form the two lower coupling points of the coupling member or trestle 96 which two lower coupling points are thus, it will be realised, in fixed positions relative to the frame of the machine. A lug 97 projects upwardly and rearwardly at the back of the apex of the substantially triangular coupling member or trestle 96 and is formeed with a hole through which a rod 98 is displaceably entered. The rod 98 is inclined downwardly, and rearwardly with respect to the direction A, from an end thereof that is located in advance of the hole through the lug 97 to the opposite end thereof which carries a sleeve that is turnable around a horizontal pin which perpendicularly interconnects the tops of the two support plates 64 of the gear box 63. Two stop rings 100 and 101 are fastened around the rod 98 at locations spaced therealong from opposite sides of the hole in the lug 97, at least one of said stop rings 100 and 101 preferably, but not essentially, being axially adjustable in position lengthwise along the rod 98. Two helical compression springs 99 are wound around the rod 98 and bear between one side of the lug 97 and the stop ring 100 and between the opposite side of the lug 97 and the stop ring 101, respectively. The springs 99 thus tend to maintain the lug in an equilibrium position that is substantially midway between the two strip rings 100 and 101 and one, or the other of said two springs 90 will oppose relative displacements of the lug 97 and the rod 98 from said equilibrium position.

In the use of the soil cultivating machine that has been described with reference to FIGS. 6 and 7 of the drawings, its coupling memaber or trestle 96 is connected to the three-point lifting device or hitch at the rear of an agricultural tractor or other operating vehicle using the singel spring-loaded upper coupling point and the two fixed lower coupling points that are partly defined by the lugs 102. The rotary input shaft 87 of the gear box 63 is placed in driven connection with the power take-off shaft at the rear of the same agricultural tractor or other operating vehicle by way of the knowm intermediate telescopic transmission shaft 88 that has universal joints at its opposite ends. As the machine moves operatively in the direction A with rotary drive applied to the input shaft 87 of the gear box 63, the driving shaft 62 is revolved and operates the pairs of eccentric mechanism 86 and 89 at the opposite ends of the shaft. The cultivating tools 55 will usually have been adjusted to working depths, as shown in FIG. 7 of the drawings, which are such that the elements 80 will move forwardly through the earth at subsoil level. The oblique inclinations of the upper surfaces of the elements 80 to the horizontal cause the layer of subsoil that is cut free by the leading ends of said element 80 to be lifted to some extent thus coarsely breaking up the overlying subsoil and disturbing the overlying top soil without, however, causing any significant intermixing of the layers. The two pivotally mounted elements 80 are located substantially in register in the direction A with the large driven rear ground wheels of the operating agricultural tractor or other vehicle and the increased lifting effect which the rocking of these two elements 80 about the axes of the pivot 81 produces compensates for the increased degree of compaction of both the top soil and subsoil that lies beneath the tread paths of said two large tractor or other vehicle wheels. It will be noted that, in this case, the pivotably mounted elements 80 are positively rocked both upwardly and downwardly by the eccentric mechanisms 86 and therefore do not need lower stops equivalent to the previously described strips 22.

The further eccentric mechanisms 89 are pivotally connectible at adjustable positions to the obliquely disposed bars 72 by the arms 90 and cause the discontinuous, but effectively elongate, soil working member 79 to reciprocate principally upwardly and downwardly although, due to the oblique positions of the bars 72, the reciprocatory motion does have a minor component that extends horizontally in substantially the direction A. The initial angularity of the parallelogram linkages 70A can be changed by causing the pivot bolts at the lower ends of the arms 90 to co-operate with different ones of the holes in the strips that are mounted at the front of the bars 72 and it will be appreciated that such changes in angularity do affect the intensity with which the elongate member 79 works the soil during the use of the machine. The upwardly and downwardly adjustable carriers 92 of the coulter discs 93 enable said discs to be set in positions in which they will cut longitudinally extending slots in the ground surface at the opposite sides of the working width of the machine so as clearly to define that working width and separate the cultivated strip of soil from neighbouring strips. It will be realised that the previously described spring-loading arrangement at substantially the apex of the coupling member or trestle 96 enables the frame of the implement and all of the parts which it carries to rock to some extent about the axes defines by the stub shafts 95 and the pivot pins which interconnect the lugs 102 against the action, at any instant, of one of the two springs 99. This semi-floating mounting of most of the machine ensures that the vibratory movements of the two pivotally supported elements 80 and the soil working member 79 that are produced will be effective to a maximum extent.

As in the case of the preceding embodiment, the elements 80 of the six cultivating tools 55, two of which elements 80 are vibrated during operation, lift and coarsely break up a subsoil layer during operative travel in the direction A, the tines 54 also contributing to the coarse disintegration of the subsoil layer. No significant mixing of the coarsely cultivated subsoil with the overlying layer of top soil is brought about and said top soil is worked more intensively, to crumble it to the extend necessary to produce a seed bed or planting bed, by the rapidly vibrated elongate soil working member 79 which member 79 has a major component of vibratory movement in a vertical direction but also a minor component that extends substantially horizontally parallel to the direction A. Thus, the use of the embodiment of FIGS. 6 and 7 of the drawings in the previously described method of soil cultivation is equally capable of bringing about deep and thorough cultivation without disturbing the biological equilibrium of the top soil by mixing that top soil with the underlying layer of coarsely broken subsoil. Although the illustrated embodiment shows only two of the six elements 80 as being pivotally mounted, it is noted that only minor modification of the implement would be required to enable all six of the elements 80 to be pivotally mounted and to be caused to vibrate upwardly and downwardly by corresponding eccentric mechanisms equivalent to the mechanisms 86. It would be equally be possible pivotally to mount any chosen number of the elements 80 that is less than the total number of those elements. The total of six elements 80 that is provided in the illustrated embodiment is not, of course, essential and machine could equally well be provided with a larger or smaller total number of cultivating tools 55 and their elements 80.

FIGS. 8 to 15 of the drawings illustrate several different cultivating tool constructions and, in particular, various arrangements by which plate-shaped elements of those tools can be moved upwardly and downwardly during the operation of soil cultivating machines which embody them. The embodiments which will be described with reference to FIGS. 8 to 15 of the drawings could be used in the machine of FIGS. 1 to 5 of the drawings or in the machine of FIGS. 6 and 7 thereof.

Figures 8, 9:
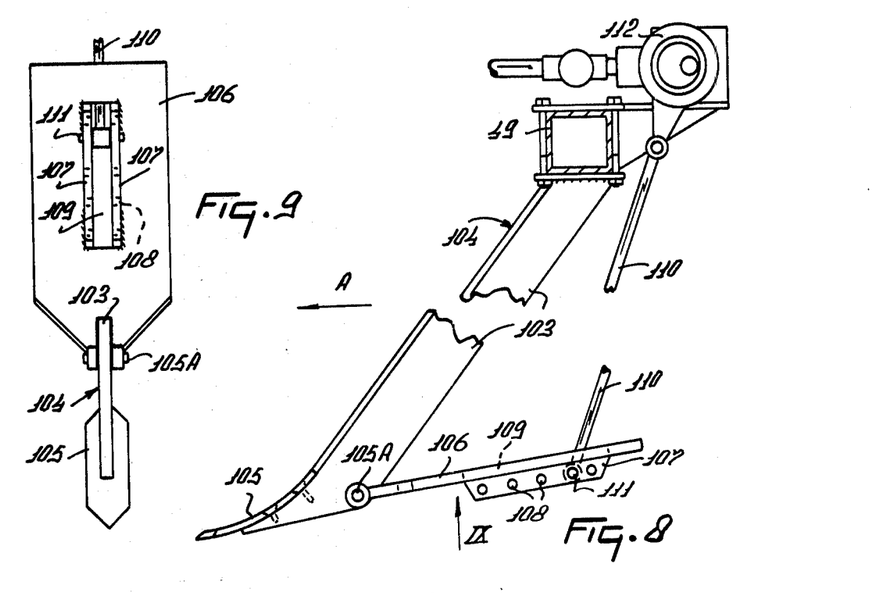
FIG. 8 is a sectional side elevation illustrating an alternative form of drive transmission.
FIG. 9 is a view as seen in the direction of an arrow IX in FIG. 8.

FIGS. 8 and 9 of the drawings illustrate an embodiment in which the frame beam 49 of the machine of FIG. 6 and 7 of the drawings has the upper ends of a plurality of strip-shaped tines 103 firmly but releasably clamped to its lower surface. The tines 103 form parts of corresponding cultivating tools 104 and each tine 103 extends obliquely downwardly and forwardly, with respect to the direction A, form the beam 49 at an angle of substantially 45° to both the horizontal and the vertical, the lower leading end of each tine 103 being provided with a corresponding pointed blade 105 that is mounted in a releasable manner. A horizontal pivot pin 105A is supported by the lower end of each tine 103 at a position in which it is shielded by the respective blade 105 that lies in advance thereof with respect to the direction A. The substantially pointed leading end of a plate shaped element 106 is turnably mounted on the pivot pin 150A by aligned sleeve bearings which lie at opposite sides of the tine 103 and it will be seen from FIGS. 8 and 9 of the drawings that the illustrated element 106 is of substantially the same shape as the previously described elements 25 and 80. The element 106 is formed with a longitudinally extending slot 109 and the lower surface thereof is provided, at the opposite edges of said slot, with parallel strips 107 in which a plurality (such as five) a pairs of horizontally aligned holes 108 are formed. A connecting rod 110 having a sleeve bearing at its lower end is entered downwardly through the slot 109 in the element 106 to bring the sleeve bearing into intervening axial register between any chosen pair of the holes 108. A pivot bolt 111 or other horizontal pivot is entered through the sleeve bearing and the chosen holes 108 to connect the rod 110 pivotally to the element 106 by way of the two strips 107. The upper end of the rod 110 is pivotally connected to an arm that is rigid with the outer orbital but non-rotary ring of an eccentric mechanism 112 which may be similar in construction and operation to one of the mechanisms 38 (FIG. 3) that has been described above. The mechanism 112 is aranged to be driven in a manner that may for example, be similar to that which has already been described with reference to FIGS. 6 and 7 of the drawings. In the use of a soil cultivating machine provided with a number of the cultivating tools 104 of FIGS. 8 and 9 of the drawings, the "Fixed" blades 105 at the lower ends of the tines 103 first cut loose a layer of subsoil which layer is subsequently lifted and further broken up by the obliquely disposed elements 106, said elements being rocked upwardly and downwardly about the axes defined by the pivot pins 105A. The intensity of upward and downward oscillation of the elements 106 can be increased or decreased, as may be desired, by connecting the rods 110 to the strips 107 at locations which are closer to, or further from, said pivot pins 150A, using the pivot bolts 111 or other horizontal pivots and appropriate pairs of the holes 108.

Figures 10, 11:
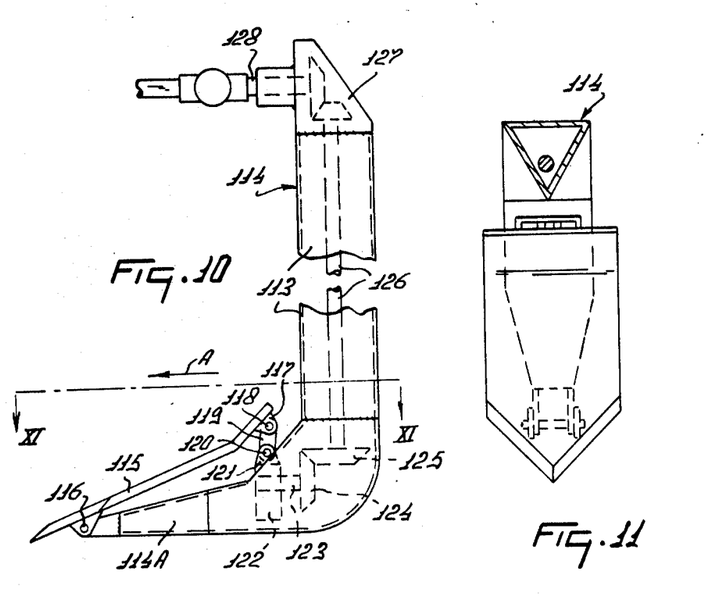
FIG. 10 is a side elevation illustrating a further alternative form of drive transmission.
FIG. 11 is a section taken on the line XI—XI in FIG. 10.

FIGS. 10 and 11 of the drawings illustrate the provision of cultivating tools 114 each of which comprises a tine 113 of substantially equilateral triangular cross-section, the tine being so orientated that one of its three angular corners is foremost with respect to the direction A. The lowermost end of the triangular cross-section portion of each tine 114 is welded or otherwise rigidly secured to a forwardly directed portion 114A. The leading extremity of the portion 114A supports a horizontal pivot pin 116 about which an overlying plate-shaped element 115 is upwardly and downwardly rockable, it being noted from FIG. 10 of the drawings that the pivot pin 116 and the lugs that co-operate therewith are located behind, and are thus shielded by, the leading cutting point of the element 115. Each element 115 has substantially the same shape as the plate-shaped elements that have been described above except that it comprises an upper rear portion that is inclined upwardly by a few degrees relative to the general plane of the major part of the element 115. The lower surface of this portion of the element 115 carries a pair of downwardly and rearwardly directed lugs 117 between which the upper end of an arm 119 is pivotally mounted by a transverse pin 118. The lowermost end of the arm 119 is similarly pivotally mounted between a pair of lugs 121 by a further transverse pin 120. The lugs 121 are rigid with the outer orbital but non-rotary ring of an eccentric mechanism 122 which, once again, may be basically similar to one of the previously described eccentric mechanisms 38 (FIG. 3). The mechanism 122 is driven by a substantially horizontal shaft 123 that extends, substantially parallel to the direction A inside the forwardly directed portion 114A of the tine 113. The rearmost end of the driving shaft 123 carries a bevel pinion 124 whose teeth are in driven mesh with those of a further bevel pinion 125 mounted at the lowermost end of a substantially vertical shaft 126 that is rotatably supported inside the hollow tine 113 by suitable disposed bearings that are not illustrated in the drawings. A gear casing 127 is provided at the upper end of the hollow tine 113 and, in said casing 127, a bevel pinion carried at the upper end of the shaft 126 is in driven mesh with a further bevel pinion carried by a substantially horizontally disposed rotary input shaft 128 of said casing 127 which shaft 128 has a leading splined or otherwise keyed end that projects forwardly from the front of the casing 127 is substantially the direction A. The rotary input shaft 128 may be driven directly from the power take-off shaft of an agricultural tractor or other operating vehicle through the intermediary of a telescopic transmission shaft of known construction having universal joints at its opposite ends but, when the machine comprises a plurality of cultivating tools 114 that are substantially in accordance with FIGS. 10 and 11 of the drawings, a common drive transmission which comprises a plurality of intermeshing bevel pinions may be substituted in a simple manner for the individual drive transmission that is illustrated in FIG. 10.

Figures 12, 13:
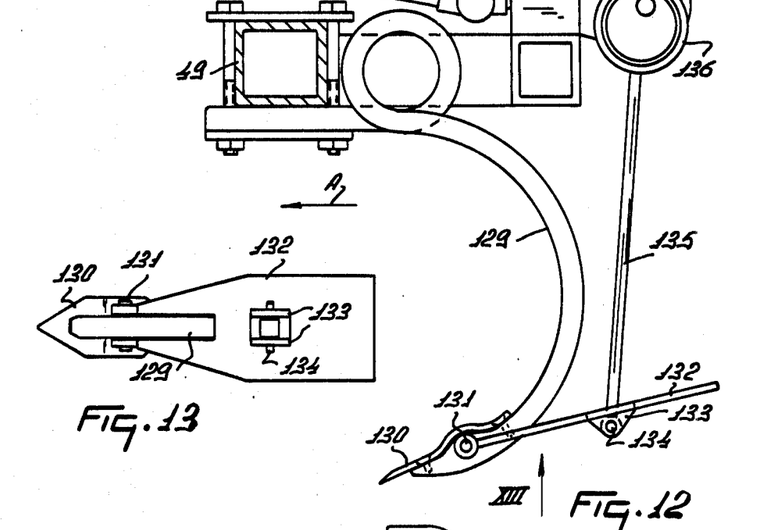
FIG. 12 is a sectional side elevation illustrating a further alternative form of drive transmission.
FIG. 13 is a view as seen in the direction indicated by an arrow XIII in FIG. 12.
Figure 14:
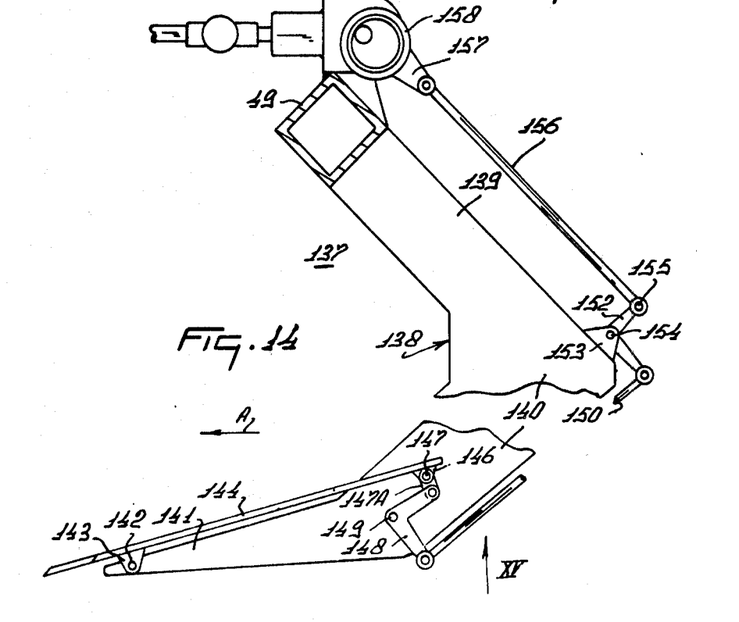
FIG. 14 is a sectional side elevation illustrating a further alternative form of drive transmission.
Figures 15, 17:
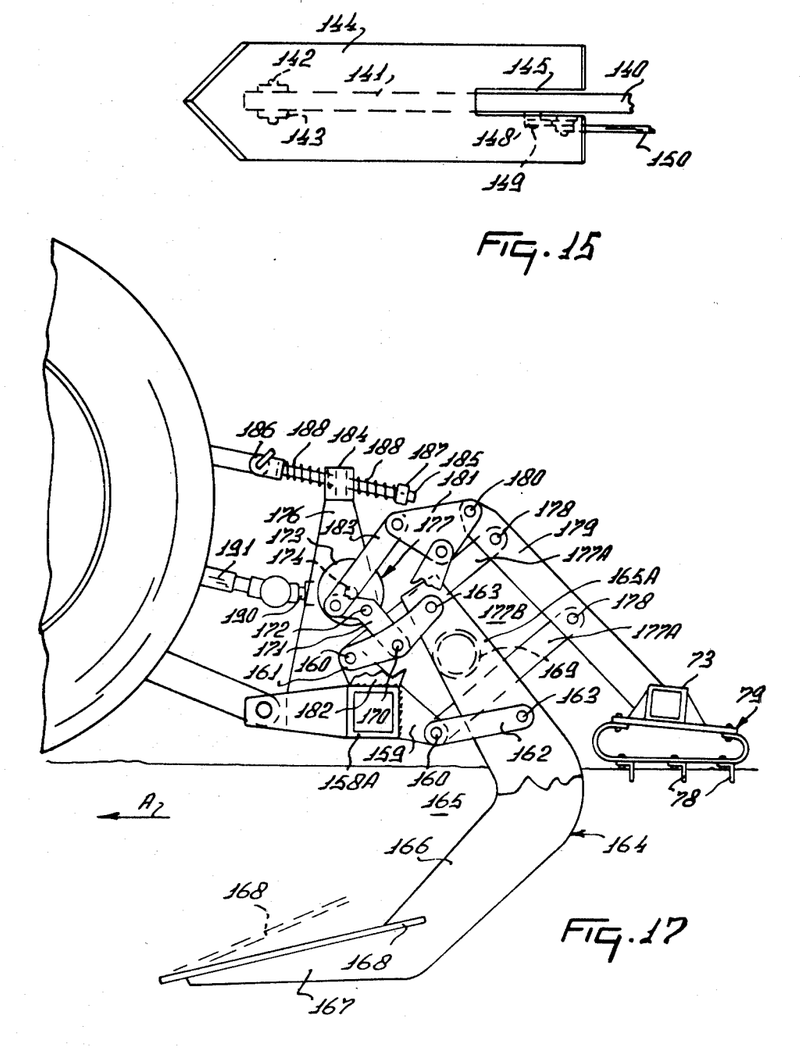
FIG. 15 is a view as seen in the direction indicated by an arrow XV in FIG. 14.
FIG. 17 is a side elevation as seen in the direction indicated by an arrow XVII in FIG. 16.

FIG. 12 and 13 of the drawings illustrate an embodiment in which each cultivating tool comprises a tine 129 formed from a single length of spring steel of other resilient material that is preferably of square or oblong cross-section. The tine 129 comprises a fastening portion that is clamped to the lower surface of the frame beam 49, a helical coil that lies just behind said beam 49 with respect to the direction A and a C-shaped soil working portion whose lowermost free end is directed downwardly and forwardly with respect to the direction A. A pointed blade 130 is releasably secured to the upper surface of the tine 129 at the free end of the soil working portion thereof, said blade being shaped so as to shield an underlying pivot pin 131 about which pivot pin the leading end, with respect to the direction A, of a corresponding obliquely disposed plate-shaped elelement 132 is rockable. The element 132 again has substantially the same shape as the plate-shaped elements which have been described above. The element 132 is formed substantially centrally with a hole and two parallel downwardly projecting lugs 133 are provided on the lower surface of the element at opposite sides of said hole. A horizontal pivot pin 134 connects the lugs 133 to an intervening bearing sleeve at the lower end of a rod 135. The upper end of the rod 135 is secured to the outer orbital but non-rotary ring of an eccentric mechanism 136 that may again be similar in construction and function to one of the previously described eccentric mechanisms 38 (FIG. 3). The mechanism 136 may be driven in a manner analogous to that which has been described above for other embodiments and, accordingly, the drive to the mechanism 136 is shown only diagrammatically in FIG. 12. It is noted that the rod 135, the pivot pin 134 and the lugs 133 are located in register behind the tine 129 with respect to the direction A. FIGS. 14 and 15 of the drawings illustrate an embodiment in which the square cross-section frame beam 49 is disposed so that diagonals between the opposite corners of its cross-section are substantially vertically, and substantially horizontally, positioned, respectively. A plurality of cultivating tools 137 are connected to the frame beam 49, each tool 137 comprising a tine 138 which comprises an initial straight portion 139 that extends downwardly and rearwardly with respect to the directon A from its connection to the beam 49. The lower end of the straight portion 139 makes an integral substantially 90° junction with a lower straight portion 140 which latter portion 140 extends downwardly and forwardly with respect to the direction A from the straight portion 139. The lowermost end of the lower straight portion 140 terminates in a forwardly directed portion 141 which tapers to a point at its leading end, the lower edge of said portion 141 being horizontally or substantially horizontally disposed. A plate-shape element 144 that is similar to the previously described plate-shaped elements comprises, near its leading end, two downwardly directed lugs 143 which lugs embrace the forwardly directed portion 141 of the tine 138 near to the leading point of that portion, a transverse pivot pin 142 being arranged rockably to interconnect the lugs 143 and the portion 141. A slot 145 extends forwardly of the element 144 from its rearmost edge and the opposite sides of said slot embrace the lower straight portion 140 of the tine 138 just above the junction of that portion 140 with the forwardly directed portion 141. The rear end of the element 144 is provided, at one side of the slot 145 and thus at one side of the tine 138, with a downwardly directed lug 146 to which one end of a short arm 147A is turnably connected by a pivot pin 147. The opposite end of the short arm 147A is turnably connected by a further horizontal pivot pin to the free end of one arm of a rockable bellcrank lever 148. The lever 148 is pivotally connected to the tine 138 by a fulcrum pin 149 and the free end of its other arm is pivotally coupled to one end of a connecting rod 150. The rod 150 extends substantially parallel to the length of the lower straigh portion 140 of the tine 138 and the end thereof that is remote from the bellcrank lever 148 is pivotally connected to the free end of one arm of a further rockable bellcrank lever 152. A pair of lugs 153 that are mounted at the rearmost edge of the upper straight portion 139 of the tine 138 support a fulcrum pin 154 about which the bellcrank lever 152 is rockable between the two lugs 153. The other arm of the bellcrank lever 152 has its free end pivotally coupled by a pin 155 to one end of a second connecting rod 156. The end of the second connecting rod 156 that is remote from the pivot pin 155 is fixedly connected to an arm that is rigid with the outer orbital but non-rotary ring of an eccentric mechanism 158. The eccentric mechanism 158 may again be similar in construction and operation to one of the previously described eccentric mechanisms 38 (FIG. 3) and it may be driven in one of the simple ways that has been described above. Accordingly, the mechanism 158 and the drive thereto are shown only diagrammatically in FIG. 14 of the drawings. It is noted that any of the plate-shaped elements which have so far been described may, if preferred, be replaced by an element in the form of a plurality of co-operating rods and/or strips.

Figure 16:
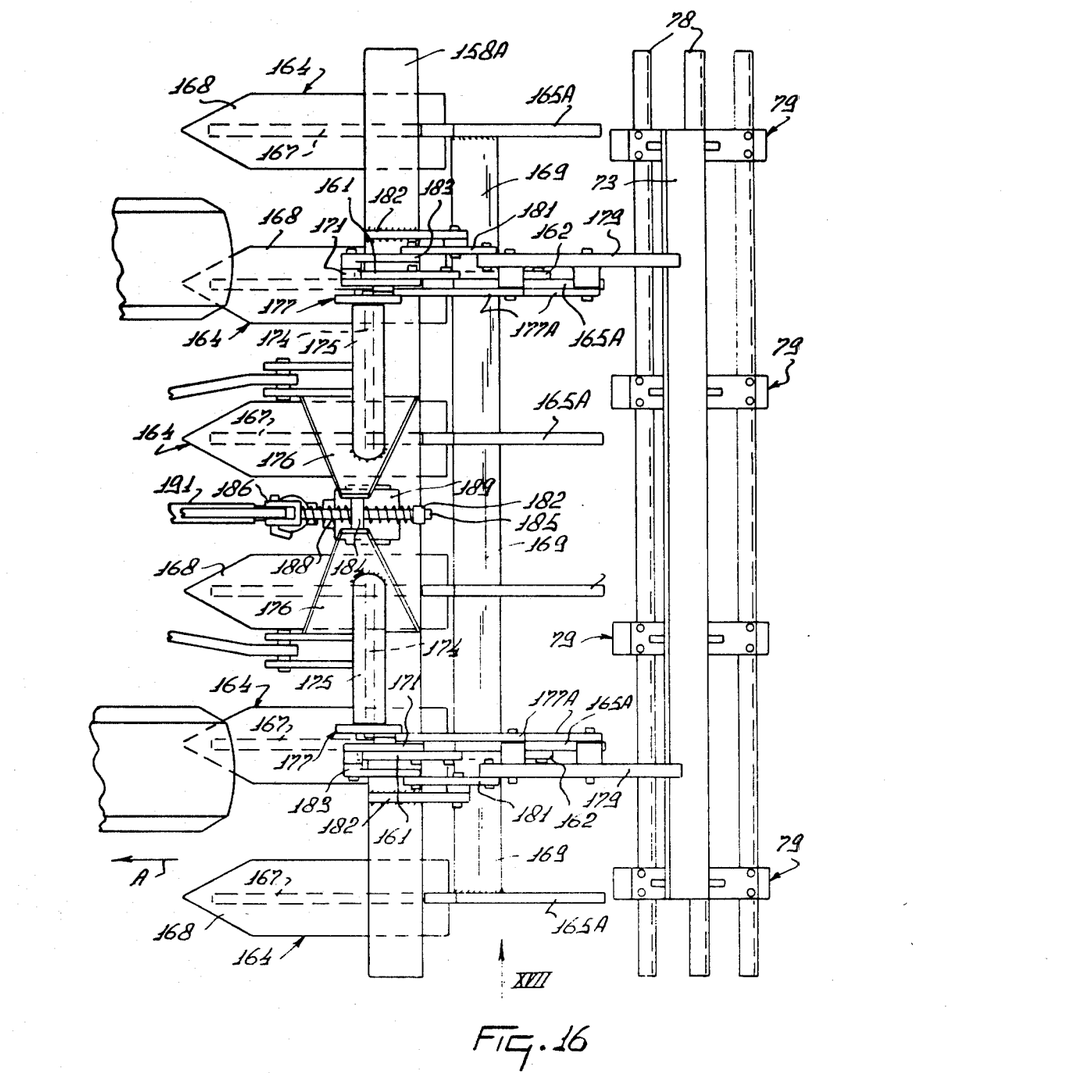
FIG. 16 is a plan view of a third embodiment of a soil cultivating machine in accordance with the invention connected to the rear of an agricultural tractor.

FIGS. 16 and 17 of the drawings illustrate a soil cultivating machine which comprises a frame beam 158A that extends substantially horizontally transverse, and usually substantially horizontally perpendicular, to the intended direction of operative travel A of the machine. The beam 158A has a polygonal cross-section and it is preferred that it should have the hollow formation and square cross-section that can be seen best in FIG. 17. With this preferred square cross-section or some other polygonal cross-section, the uppermost and lowermost surfaces of the beam 158A are both horizontally or substantially horizontally disposed. Lugs 159 are rigidly secured to the upper and rear surfaces of the beam 158A at locations which are spaced by equal distances from the opposite ends of that beam and afford coupling points to which upper arms 161 and lower arms 162 are pivotally connected by horizontal pins 160. The arms 161 and 162 extend generally rearwardly with respect to the direction A from their pivot pins 160 and their rearmost ends are coupled by further parallel pivot pins 163 to spaced apart locations on corresponding tines 164 that form parts of respective cultivating tools 165. Each tine 164 comprises an upper straight portion 165A which extends downwardly and rearwardly with respect to the direction A from its upper end and a lower straight portion 166 that makes a substantially 90° junction with the portion 165A so as to extend downwardly and forwardly with respect to the direction A from said juncion. The two portions 165A and 166 are of substantially equal lengths and the lowermost end of the lower portion 166 terminates in a forwardly directed portion 167 that comes to a point or tip at its leading extremity, the lower edge of said portion 167 being substantially horizontally disposed. The upper edge of the forwardly directed portion 167 of the tine 164 is inclined upwardly and rearwardly away from said point or tip with respect to the direction A and affords a supporting surface for a corresponding plate-shaped element 168. As can be seen in FIG. 16 of the drawings, the elements 168 are of substantially the same form as the various plate-shaped elements that have been described above, each obliquely disposed element 168 terminating at its leading lower extremity in a point. A tubular beam 169 interconnect the two tines 164 that are coupled to the respective pairs of arms 161 and 162 and project laterally beyond those tines towards the opposite sides of the machine. The beam 169 mounts the tines 164 of four further cultivating tools 165.

Pivot pins 170 couple substantially the midpoints of the upper arms 161 to the ends of further rockable arms 171, intermediate locations along the lengths of the rockable arms 171 being coupled by eccentric pivot pins 172 to corresponding rotary discs 173. The discs 173 are secured to the opposite ends of a driving shaft 174 that is rotatably journalled in a horizontal tube 175 so as to project by short distances beyond the opposite ends of that tube. A central region of the tube 175 is supported by upwardly convergent side plates of a coupling member or trestle 176 of the machine, said coupling member or trestle 176 being constructed and arranged to define a single upper coupling point and two horizontally spaced apart lower coupling points for connection to the three-point lifting device or hitch of an agricultural tractor or other operating vehicle. The rotary discs 173, the eccentric pivot pins 172 and the rockable arms 171 together afford eccentric mechanisms that are generally indicated by the reference 177.

The pivot pins 160 by which the leading ends of the upper and lower arms 161 and 162 are coupled to the lugs 159 also pivotally connect the lower leading ends of corresponding pairs of arms 177A to said lugs 159. The arms 177A extend obliquely upwardly and rearwardly with respect to the direction A from the pivot pins 160 in parallel relationship with one another and have their upper rearmost ends connected to spaced apart locations between the limbs of channel-shaped supports 179 by pivot pins 178. The webs or bases of the channel-shaped supports 179 are located at the rear edges of the limbs thereof with respect to the direction A and it will be seen from FIG. 17 of the drawings that the pivot pins 178 are spaced apart from one another by the same distance as are the pivot pins 160. The supports 179 and arms 177A form parts of two pivotable linkages which, in this case, are parallelogram linkages 177 B. The two parallelogram linkages 177B may be considered as forming two units of a dual parallelogram linkage. The supports 179 are inclined steeply downwardly and rearwardly with respect to the direction A from their leading to their rearmost ends and said rearmost ends are secured to spaced apart locations on the previously described beam 73, said beam 73 carrying the elongate soil working member 79 that has already been described above in connection with the embodiment of FIGS. 6 and 7 of the drawings. The uppermost ends of the two inclined supports 179 are connected by pivot pins 180 to upper rear corners of corresponding triangular rockers 181. The lowermost corners of the triangular rockers 181 are pivotally connected by fulcrum pins to the uppermost ends of support arms 182 that are rigidly secured to the top of the beam 158A (the support arm 182 that is shown in FIG. 17 of the drawings being partly broken away to avoid concealing other members of the machine). The support arms 182 are inclined upwardly and rearwardly, with respect to the direction A, away from the top of the beam 158A. The third corner of each triangular rocker 181, which is the foremost corner thereof with respect to the direction A, is connected by a pivot pin to the upper end of a downwardly and forwardly inclined arm 183, the lower leading ends of the two arms 183 being connected by further pivot pins to the leading ends of the aforementioned rockable arms 171, said ends being remote from the ends of those arms 171 that are pivotally connected to the upper arms 161 by the pivot pins 170.

The upwardly convergent side plates of the aforementioned coupling member or trestle 176 are provided, at the top thereof, with a lug 184 whose general plane is substantially perpendicular to the direction A. The lug 184 is formed with a hole through which a rod 185 is slidably entered, the leading end of said rod 185 with respect to the direction A being provided with a fork 186. A releasable combined horizontal locking pin and pivot pin connects the fork 186 to the free end of the upper lifting link of the rear-mounted three-point lifting device or hitch of an agricultural tractor or other operating vehicle when the machine is in use. The rearmost end of the rod 185 with respect to the direction A, which end is spaced rearwardly from the lug 184, carries a stop ring 187 which may conveniently, but not essentially, be adjustable in position axially along the rod. Two helical compression springs 188 are wound around the rod 185 so as to bear the leading surface of the lug 184 and the base of the fork 186 and between the rear surface of the lug 184 and the leading surface of the stop ring 187, respectively. It will be apparent that the springs 188 will tend to maintain an equilibrium position in which, assuming that they are of equal lengths and equal strengths, the lug 184 is located midway between the fork 186 and the stop ring 187 and that one, or the other, of said two springs 188 will oppose any significant deviation from this equilibrium position. A gear box 189 is mounted between the upwardly convergent side plates of the coupling member or trestle 176, its opposite sides being connected to aligned portions of the tube 175 and the driving shaft 174 that is located inside said tube 175 being provided, inside the gear box 189, with a bevel pinion (not visible). The gear box has a rotary input shaft 190 that projects substantially horizontally forwards from the front of that gear box in substantially the direction A, the rotary input shaft 190 being provided, inside the gear box 189, with a further bevel pinion (not visible) that has its teeth in driving mesh with those of the bevel pinion carried by the shaft 174. The forwardly projecting leading end of the rotary input shaft 190 is splined or otherwise keyed to enable it to be placed in driven connection with the rear power take-off shaft of an agricultural tractor or other operating vehicle by way of an intermediate telescopic transmission shaft 191, that is of a construction which is known per se, having universal joints at its opposite ends.

In the use of the soil cultivating machine that has been described with reference to FIGS. 16 and 17 of the drawings, its coupling member or trestle 176 is connected to the three-point lifting device or hitch of an agricultural tractor or other operating vehicle employing the combined horizontal locking pin and pivot pin that is provided with the fork 186 and lower horizontally aligned pivots that interconnect pairs of lugs which project forwardly with respect to the direction A from the leading surface of the frame beam 158A. The rotary input shaft 190 of the gear box 189 is placed in driven connection with the rear power take-off shaft of the same agricultural tractor or other operating vehicle by way of the known telescopic transmission shaft 191 that has universal joints at its opposite ends. The cultivating tools 165 penetrate downwardly into the ground to a considerable depth and certainly into the subsoil whereas the elongate soil working member 79 at the rear of the machine operates substantially only upon the overlying top soil at substantially only ground level. The upwardly and rearwardly, with respect to the direction A, obliquely disposed elements 168 cut free a layer of the subsoil and raise that layer, with the overlying top soil, as the machine proceeds in the direction A. The loosening effect and the coarse break up of the subsoil is enchanged by the upward and downward reciprocation of the tines 164 that is brought about by operation of the eccentric mechanisms 177. Said mechanisms 177 transmit their motion to the tines 164 through the pivotable linkages that comprise the arms 161 and 162 and, in practice, said tines 164 oscillate upwardly and downwardly about a substantially horizontal axis that substantially intersects the points at the fronts of all of the elements 168 (see the full line and broken line positions of one element 168 that are shown in FIG. 17). The top soil is worked by the member 79, that member also being caused to vibrate with a motion that has both a vertical component and a horizontal component that is parallel to the direction A, the movement of the member 79 being effected from the discs 173 by way of the arms 183 and the rockers 181 but the attitude of the supports 179 to the ground surface being maintained substantially constant because of the connection of the supports 179 to the lugs 159 by the arms 177A of the parallelogram linkages 177B. The spring loaded connection the top of the coupling member or trestle 176 to the upper lifting link of the three-point lifting device or hitch of the agricultural tractor or other operating vehicle ensures that the vibratory movements of the cultivating tools 165 and soil working member 79 that take place during operation of the machine are not suppressed and will be effective to a maximum extent in benefiting the cultivating action of the machine. Once again, deep cultivation is performed with a coarse break up of the subsoil and a somewhat finer crumbling action upon the overlying top soil Very little, if any, intermixing of the treated subsoil and overlying top soil occurs and the biological equilibrium of the top soil, particularly its microbiological equilibrium, is disturbed to such a minor extent, if at all, that natural factors will restore that equilibrium after only a very short period of time.

Although various features of the soil cultivating machines that have been described and/or that are illustrated in the accompanying drawings will be set forth in the following claims as inventive features, it is emphasised that the invention is not necessarily limited to those features and that it includes within its scope each of the parts of each soil cultivating machine that has been described, and/or that is illustrated in the accompanying drawings, both individually and in various combinations.

What we claim is:

1. A soil cultivating machine comprising at least one soil working member, said soil working member comprising a tine with a subsoil portion, a forwardly extending plate-shaped element being pivotably connected adjacent to the lower end of said subsoil portion by a pivot, said pivot being located below the leading part of said element and immediately in front of said portion, said pivot being supported on stop means and said stop means positioned to limit the downward movement of said plate-shaped element, said stop means being mounted adjacent the lower end of said subsoil portion and underneath said plate-shaped element, driving means, including at least one eccentric and linkage means interconnecting said eccentric to said plate-shaped element to positively displace said element upwardly while freely permitting soil resistance to displace said element downwardly during operation of the machine.

2. A machine as claimed in claim 1, wherein said driving means includes a rotatable shaft and said linkage means comprises a rocker pivoted to a connecting rod that is pivotably linked to the rear of said element, said rocker being pivoted by said eccentric and the latter being mounted on the rotatable shaft.

3. A machine as claimed in claim 1, wherein said element at least partially surrounds the tine and the latter is entered through a slot in said element.

4. A machine as claimed in claim 3, wherein said stop means comprises at least one elongated strip fastened to the lower end of the subsoil portion, the lower pivotal movement of said element being defined by said strip.

5. A machine as claimed in claim 1, wherein said linkage means includes a connecting rod and a pivotal coupling between said rod and the element is located beneath the latter.

6. A machine as claimed in claim 1, wherein said eccentric comprises an eccentric disc and a ring which surrounds the periphery of that disc, said periphery being rotatable within said ring and the latter bearing against a slider carried by said rocker.

7. A machine as claimed in claim 6, wherein said slider is urged into contact with said ring by the resistance to soil engaged by the element during operative travel, said resistance being transmitted to the slider via said rod and rocker.

8. A soil cultivating machine comprising a plurality of soil working members arranged in a transverse row, at least one of said members comprising a tine with a substantially straight, forwardly extending subsoil portion, a plate-shaped element being pivotably connected to the lower end of said portion by a pivot and said element extending obliquely downwardly towards the front of the machine, said pivot being located below the leading part of said element and immediately in front of said subsoil portion, said pivot being supported on stop means that limits the downward movement of said plate-shaped element, said stop means being mounted adjacent the lower end of said subsoil portion, driving means, including at least one eccentric and linkage means interconnecting said eccentric to said member, said eccentric and said linkage means both being located to the rear of the tine and connected to positively displace said element upwardly while freely permitting soil resistance to displace said element downwardly during operation of the machine.

9. A machine as claimed in claim 8, wherein a further soil working member is positioned to the rear of said tines and said further member is elongated, the further member having ground engaging means extending transverse to the direction of travel and being linked to said frame.

10. A machine as claimed in claim 8, wherein said stop means is located below said element and said element is raised by said driving means above the stop means to loosen the subsoil.

11. A machine as claimed in claim 10, wherein soil working rotors with tines are positioned to the rear of said members to work the topsoil, said rotors being driven about upwardly extending shafts of said driving means, said eccentric being mounted on one of the shafts and being rockably linked to the rear of said element.

12. A soil cultivating machine comprising a plurality of soil working members arranged in a transverse row, at least one of said members comprising a tine with a substantially straight, forwardly extending subsoil portion, a plate-shaped element being pivotably connected to the lower end of said portion by a pivot and said element extending obliquely downwardly towards the front of the machine, said pivot being located below the leading part of said element and immediately in front of said subsoil portion, stop means on said tine being positioned below said element adjacent the lower end of the subsoil portion, said element having a slot and the subsoil portion of said tine extending through the slot, driving means including an eccentric and linkage means connected to the rear of said element to turn the element about said pivot and periodically lift the element against the resistance of the ground while freely permitting soil resistance to displace said element downwardly.

* * * * *